(12) United States Patent
Quackenbush

(10) Patent No.: US 7,452,512 B2
(45) Date of Patent: Nov. 18, 2008

(54) CONVERTER ASSEMBLY WITH INSULATED SENSOR BOSS

(75) Inventor: James Quackenbush, Columbus, IN (US)

(73) Assignee: ET US Holdings LLC, Wilmington, DE (US)

( * ) Notice: Subject to any disclaimer, the term of this patent is extended or adjusted under 35 U.S.C. 154(b) by 508 days.

(21) Appl. No.: 11/048,430

(22) Filed: Feb. 1, 2005

(65) Prior Publication Data

US 2006/0171865 A1    Aug. 3, 2006

(51) Int. Cl.
*B01D 50/00* (2006.01)
(52) U.S. Cl. ..................................................... 422/171
(58) Field of Classification Search ................. 422/168, 422/171, 172, 174, 180; 60/299, 301
See application file for complete search history.

(56) References Cited

U.S. PATENT DOCUMENTS

| | | | |
|---|---|---|---|
| 4,322,388 A | 3/1982 | Hardin | |
| 4,425,304 A * | 1/1984 | Kawata et al. | 422/171 |
| 4,536,371 A | 8/1985 | Thayer | |
| 5,829,132 A | 11/1998 | Sickels | |
| 6,001,314 A * | 12/1999 | Buck et al. | 422/177 |
| 2004/0105792 A1 | 6/2004 | Worner | |
| 2004/0170540 A1 | 9/2004 | Barron | |
| 2006/0024215 A1 * | 2/2006 | Kroner et al. | 422/179 |

FOREIGN PATENT DOCUMENTS

EP    1422396 A    5/2004

OTHER PUBLICATIONS

International Search Report, dated May 4, 2006.

* cited by examiner

*Primary Examiner*—Tom Duong
(74) *Attorney, Agent, or Firm*—Carlson, Gaskey & Olds, PC

(57) ABSTRACT

A converter assembly includes an outer shell defining an internal cavity that receives first and second catalyst substrates, which are spaced apart from each other to form a gap. A solid inner ring with a sensor boss is installed within the internal cavity. The solid inner ring is positioned in the gap between the first and second catalytic substrates. The solid inner ring provides insulation within the gap. The sensor boss extends radially outwardly beyond an outer surface of the outer shell. The sensor boss is welded to the outer surface of the outer shell to prevent exhaust gas leakage.

2 Claims, 1 Drawing Sheet

CONVERTER ASSEMBLY WITH INSULATED SENSOR BOSS

TECHNICAL FIELD

The subject invention relates to a converter assembly that includes an outer shell with an insulated inner ring positioned inside the outer shell, and wherein the insulated inner ring includes a sensor boss that extends out beyond the outer shell.

BACKGROUND OF THE INVENTION

A catalytic converter assembly includes an outer shell defining an internal cavity that receives a catalyst substrate. The catalyst substrate can be formed as a single piece or can be separated into multiple pieces. Typically, the catalyst substrates are wrapped with an insulating material. This reduces heat radiation to adjacent components in a vehicle underbody.

During vehicle operation, sensors are often used to monitor certain catalytic converter characteristics. For example, a catalytic converter assembly often includes an oxygen sensor. The oxygen sensor is attached to a sensor boss that is installed on the outer shell. In one configuration, the sensor boss is attached to a catalytic converter assembly having an outer shell with a pair of catalytic substrates received within the internal cavity.

In this example, the catalytic substrates are spaced apart from each other so that the sensor boss can be secured to an area near a center of the outer shell. When the catalytic substrates are spaced apart from each other, a gap is created within the internal cavity. The gap forms an uninsulated area within the outer shell.

This uninsulated area can increase heat radiation to adjacent components on the vehicle underbody. Another disadvantage with this configuration concerns pulsations in an exhaust stream flow, which are caused by the gap. Exhaust stream pulsations can erode the insulating material that is wrapped around the catalyst substrates. Additionally, the gap can generate shell warpage, which can also lead to erosion. Erosion of the insulating material can adversely affect the durability of the catalytic converter assembly.

Thus, there is a need for a catalytic converter assembly that includes an insulated area for a sensor boss. The sensor boss should also be easily installed and improve overall durability as well as overcoming the other above-mentioned deficiencies with the prior art.

SUMMARY OF THE INVENTION

A converter assembly includes an outer shell with an outer surface and an inner surface defining an internal cavity. At least one catalytic substrate is positioned within the internal cavity. A sensor boss support is positioned within the internal cavity adjacent the catalytic substrate. The sensor boss support includes a sensor boss that extends outwardly beyond the outer surface of the outer shell. A sensor can then be coupled to the sensor boss to measure a desired catalytic converter characteristic.

In one example, the sensor boss support comprises a solid inner ring that is positioned in the internal cavity. The solid inner ring includes an outer circumferential surface. The sensor boss extends radially outwardly from the outer circumferential surface. The sensor boss is joined to the outer surface of the outer shell at an attachment interface. This attachment interface is the sole attachment between the sensor boss support and the outer shell.

In one disclosed embodiment, the converter assembly includes first and second catalyst substrates, which are spaced apart from each other to form a gap. The solid inner ring is positioned within the internal cavity, in the gap, between the first and second catalytic substrates. The solid inner ring provides insulation within the gap. The sensor boss extends outwardly from the outer surface of the outer shell. The sensor boss is welded to the outer surface of the outer shell to prevent exhaust gas leakage.

The subject invention provides an insulated sensor boss support that improves durability and structural integrity of the catalytic converter assembly. These and other features of the present invention can be best understood from the following specification and drawings, the following of which is a brief description.

DETAILED DESCRIPTION OF THE PREFERRED EMBODIMENT

Figure 1:
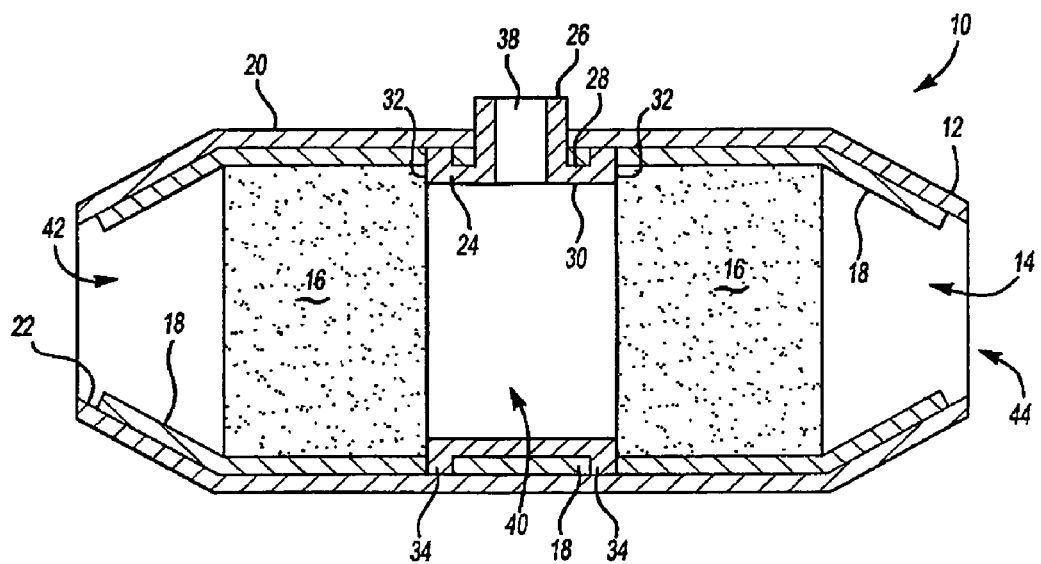
FIG. 1 is a schematic cross-sectional view of a catalytic converter assembly incorporating the subject invention.

A converter assembly for an exhaust system is shown generally at 10 in FIG. 1. The converter assembly 10 includes an outer shell 12, also referred to as a can, which defines an internal cavity 14. The converter assembly 10 can operate with or without a substrate depending upon design requirements. In the example shown in FIG. 1, the converter assembly 10 includes at least one catalyst substrate 16 and preferably includes a pair of catalyst substrates 16.

The catalyst substrates 16 are received within the internal cavity 14. As known, the catalyst substrate 16 is a substance that speeds up a chemical reaction rate. In an automotive exhaust application, the catalyst substrate 16 comprises an inert substance onto which an active wash coat is added. The catalyst substrate 16 speeds up oxidation of unconverted hydrocarbons and carbon monoxide into water and carbon dioxide. The materials used for the inert substance and active wash coat, and the operation of a catalytic converter is well known and will not be discussed in further detail.

The converter assembly 10 includes mats 18 that are compressed between the outer shell 12 and the catalyst substrates 16. The outer shell 12 includes an external surface 20 and an internal surface 22 that defines the internal cavity 14. The mats 18 are compressed against the internal surface 22, and provide insulation and help reduce noise. Any type of insulating mat material known in the art could be used for mats 18. The mats 18 are preferably wrapped around the catalyst substrates 16. Each catalyst substrate 16 could be wrapped separately or could be wrapped with another adjacent catalyst substrate 16.

A sensor boss support 24 is positioned within the internal cavity 14 between the pair of catalyst substrates 16. The sensor boss support 24 includes a sensor boss 26 that extends outwardly from the external surface 20 of the outer shell to a distal portion that is beyond the external surface 20 of the outer shell 12. The sensor boss 26 can be used for any type of exhaust sensor, however, the sensor boss 26 is preferably used for an oxygen sensor (not shown). The exhaust sensors are used to measure and monitor catalytic converter operating characteristics as needed. The operation of exhaust sensors, such as an oxygen sensor, is well-known and will not be discussed in further detail.

Figure 2:
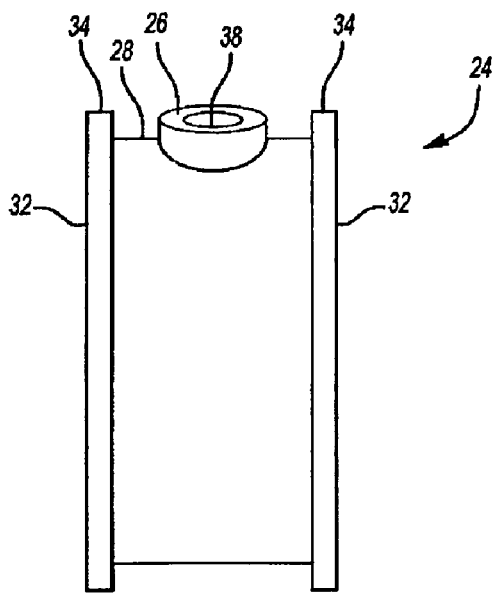
FIG. 2 is a perspective view of a sensor boss support as used in the catalytic converter assembly of FIG. 1.

As shown in FIGS. 1 and 2, the sensor boss support 24 includes a solid ring-shaped, single piece body with an outer circumferential surface 28 and an inner circumferential surface 30. The outer circumferential surface 28 is spaced apart from the internal surface 22 of the outer shell 12 to form a gap. The sensor boss support 24 can be wrapped with the mat 18 to at least partially fill the gap. The sensor boss 26 extends radially outwardly from the outer circumferential surface 28. The solid ring-shaped body includes a pair of opposing ring edges 32. The opposing ring edges 32 each include a retaining flange portion 34. Each retaining flange portion 34 abuts against one of the catalyst substrates 16. The retaining flange portions 34 have a greater diameter than the outer circumferential surface 28 such that the retaining flange portions 34 terminate at a radially outward surface that abuts directly against the internal surface 22 of the outer shell 12. The retaining flanges 34 thus provide a retaining surface that assists in positioning and aligning the catalyst substrates 16 within the internal cavity 14.

Figure 3:
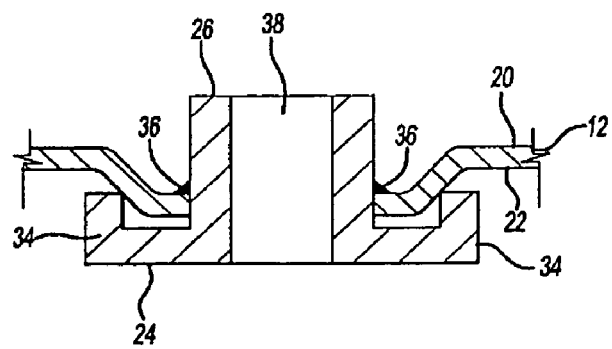
FIG. 3 is a schematic cross-sectional view of an interface between a sensor boss and outer shell of a catalytic converter assembly.

As shown in FIG. 3, the sensor boss 26 is attached or joined to the external surface 20 of the outer shell 12 at 36. The sensor boss support 24 is preferably formed from steel and is welded at 36 to the outer shell 12. This is the sole attachment of the sensor boss support 24 to the outer shell 12. It should be understood that the profile of the outer shell 12 could be formed in various configurations, with the profiles shown in FIGS. 1 and 3 showing two example profiles.

The sensor boss 26 includes an opening 38 that is fluid communication with the internal cavity 14. As discussed above, the sensor boss 26 provides a mounting interface for an exhaust sensor, such as an oxygen sensor. Exhaust flows through the internal cavity 14 and exhaust characteristics can be measured and monitored as needed via the opening 38.

The sensor boss support 24 can be wrapped with a mat 18 in a similar manner to that described above with regard to wrapping of the catalytic substrate 16. Optionally, the sensor boss support 24 can be installed within the internal cavity 14 without a mat 18 as shown in FIG. 3.

The use of the sensor boss support 24 by itself, or in combination with an insulating mat 18, provides additional insulation in an area between the pair of catalyst substrates 16 that has traditionally been uninsulated. The catalyst substrates 16 are separated within the internal cavity 14 so that a sensor boss can be installed on the outer shell 12. This separation has created the uninsulated area. In the past this uninsulated area created concerns with heat radiation to adjacent vehicle underbody components and converter durability due to shell warpage. Warpage can lead to erosion and loss of the catalyst substrate 16 and/or insulating mat 18.

The subject invention utilizes the solid sensor boss support 24 in a separation area 40 to provide insulation. The sensor boss support 24 is subsequently welded in place at the external surface 20 of the outer shell 12 to provide a secure sensor boss attachment interface. The sensor boss support 24 protects the mat 18 from erosion, which can result from pulsations of an exhaust stream flow through the internal cavity 14 from an exhaust inlet 42 to an exhaust outlet 44.

The use of the sensor boss support 24 is particularly suited to tourniquet wrap converter assemblies. The tourniquet wrap process itself is well-known and will not be discussed in detail After the tourniquet process has formed the outer shell 12, the sensor boss 26 is welded to the external surface 20 of the outer shell 12. This prevents exhaust leakage to the atmosphere.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A converter assembly comprising:

an outer shell having an outer surface and an inner surface defining an internal cavity;

at least one catalytic substrate received within said internal cavity; and a sensor boss support positioned within said internal cavity adjacent said at least one catalytic substrate, said sensor boss support comprising a solid inner ring with a single-piece body having an outer circumferential surface with a sensor boss extending radially outward from said outer circumferential surface, and with a retaining flange portion being formed at each edge of said solid inner ring to extend radially outward such that said retaining flange portions have a greater diameter than said outer circumferential surface, and wherein said sensor boss extends outwardly beyond said outer surface of said outer shell, wherein each of said retaining flange portions terminates at a radially outward surface that abuts against said inner surface of said outer shell, wherein said outer circumferential surface is spaced apart form said inner surface of said outer shell to form a gap; and a mat wrapped around said solid inner ring to at least partially fill said gap.

2. A converter assembly comprising:

an outer shell having an outer surface and an inner surface defining an internal cavity;

at least one catalytic substrate received within said internal cavity;

a solid ring positioned within said internal cavity adjacent said at least one catalytic substrate, said solid ring comprising a single-piece body having an outer circumferential surface and an inner circumferential surface defining a single center opening, said solid ring including a sensor boss extending radially outward from said outer circumferential surface to a distal portion that is beyond said outer surface of said outer shell, and said solid ring including a first retaining flange portion formed at one edge of said solid ring and a second retaining flange portion formed at an opposing edge of said solid ring, and wherein said first and said second retaining flange portions extend radially outward from said outer circumferential surface such that said first and said second retaining flange portions have a greater diameter than said outer circumferential surface;

said first and said second retaining flange portions terminating at a radially outward surface that abuts directly against said inner surface of said outer shell, and wherein said outer circumferential surface is spaced apart form said inner surface of said outer shell to form a gap; and a mat wrapped around said solid ring to fill said gap.

* * * * *

UNITED STATES PATENT AND TRADEMARK OFFICE
CERTIFICATE OF CORRECTION

PATENT NO. : 7,452,512 B2  Page 1 of 1
APPLICATION NO. : 11/048430
DATED : November 18, 2008
INVENTOR(S) : Quackenbush It is certified that error appears in the above-identified patent and that said Letters Patent is hereby corrected as shown below:

Claim 1, Column 4, line 30: "form" should read as --from--

Claim 2, Column 4, line 59: "form" should read as --from--

Signed and Sealed this

Third Day of February, 2009

JOHN DOLL
*Acting Director of the United States Patent and Trademark Office*